Oct. 1, 1946. H. WOLCOTT Re 22,798

TOGGLE FASTENING MEANS FOR FLOATING CLOSURES

Original Filed Oct. 5, 1940

INVENTOR,
Herbert Wolcott.
BY
Roy E. Hamilton,
ATTORNEY.

Reissued Oct. 1, 1946

Re. 22,798

UNITED STATES PATENT OFFICE 22,798

TOGGLE FASTENING MEANS FOR FLOATING CLOSURES

Herbert Wolcott, Columbia, Mo.

Original No. 2,342,095, dated February 15, 1944, Serial No. 359,886, October 5, 1940. Application for reissue February 15, 1945, Serial No. 578,068

5 Claims. (Cl. 220—57)

This invention relates to improvements in closures and has particular reference to hand operated closures for water-softener tanks and the like, and has for its principal object the provision of a closure that is efficient and can be easily closed and opened by hand and without the aid of tools.

A further object of the present invention is the provision of a closure having a cover member equipped with means whereby it is lifted to break the seal as the cover securing means is operated into cover releasing position.

Another object of the invention is the provision of a closure construction having a cup shaped cover member with securing means whereby the cover member is contacted (in the cover closing or securing operation) at its center portion and below the plane of the sealing joint.

A still further object of this invention is the provision of a closure construction wherein all the movable parts are demountably connected together.

Other objects are simplicity and economy of construction, ease and efficiency of operation, and adaptability for use with various types of containers.

Reference will now be had to the accompanying drawing wherein.

Figure 1:
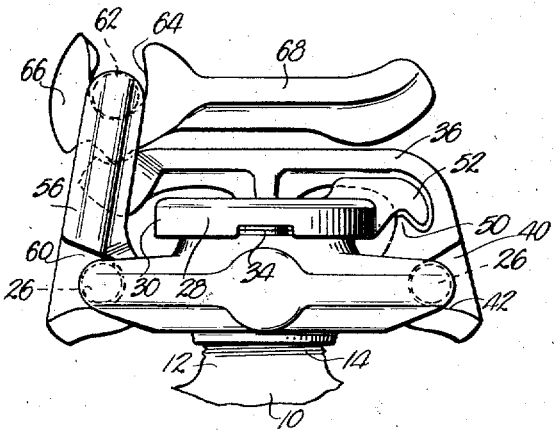
Figure 1 is a side elevation of a closure construction embodying this invention.
Figure 2:
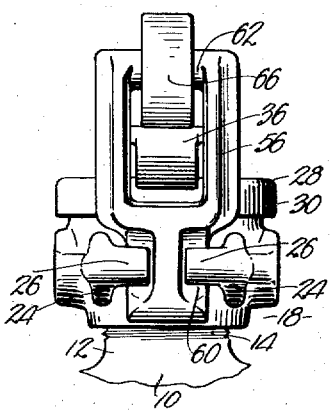
Figure 2 is an end elevation of the closure.
Figure 3:
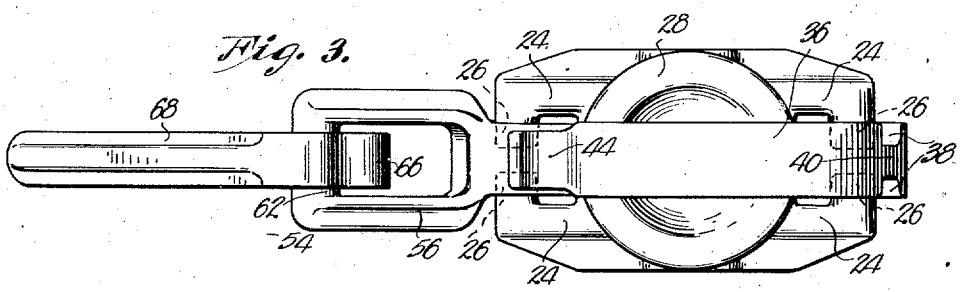
Figure 3 is a plan view of the closure with the securing cam arm in open or cover-releasing position.

Like references refer to similar parts throughout the several views of the drawing, and the numeral 10 designates a portion of a tank having a top inlet portion 12 which is externally threaded at 14 to receive the internal threads 16 of the closure body member 18 having the central opening 20 through which materials may be delivered to and from the tank. The upper edge 22 of the body member 18, surrounding the opening 20, is preferably circular and in a horizontal plane to present a smooth and even seating surface for sealing the closure as hereinafter set forth.

The body member 18 has two pairs of outwardly projecting arms 24, said pairs being disposed on opposite sides of the body and each arm being provided with an inturned cylindrical trunnion 26. The trunnions 26 on adjacent arms 24 are in axial alignment and in spaced apart relation to each other as well as to the body of the member 18.

A cup-shaped cover member 28 is provided with an annular flange 30 having a downturned groove 32 adapted to receive the upper edge portion or seat 22 of the body member 18, with suitable gaskets 34 of compressible sealing material such as rubber, disposed therebetween to form an airtight seal.

A cross bar or lever 36 is formed with a longitudinal reinforcing rib and provided at one end with spaced apart recesses 38 adapted to respectively receive the trunnions 26 at one side of the body member 18 for pivoting thereon. It is apparent that by properly positioning the bar 36, its web portion 40 dividing the recesses 38 can be inserted between the spaced apart trunnions 26, and as the bar is moved to the position over across the cover member 28 the trunnions will rest in the bearings 42 provided by said recesses 38 in said end portion of the bar 36, and can not be released therefrom until the bar is again moved back to the point of insertion. The free end of the bar 36 projects beyond the periphery of the cover member 28 and is provided with a depression 44.

A depending lug 46 is provided at the middle portion of the bar or lever 36, and has a rounded end portion 48 adapted to contact the cover member 28 at its central point, and below the gaskets 34, when operated to force the cover member 28 toward the body member 18 and thereby compress the gaskets 34.

It has been found convenient to use ordinary fruit jar rubber gaskets in this closure. These gaskets are of a suitable thickness so that if the joint is not sufficiently tight another fruit jar rubber may be added without interfering with the operation of the closure parts.

When the closure has been secured in the closed position for a period of time it is ofttimes found difficult to release the cover member from its sealing position. To overcome this difficulty and to insure that the cover seal will always be broken when the bar 36 is moved outwardly from its position above the cover member 28 the following gasket loosening means is provided.

A lug 50 positioned at each side of the longitudinal reinforcing rib of the bar 36 adjacent its pivoted end is adapted to move through an arc as said bar is pivoted on the trunnions 26. Arcuate tongues 52 integral with the cover member 28 are positioned in spaced relation for accommodating said rib and in the path of travel of the lugs 50, whereby when the parts are in the closed position and the bar 36 is moved into open position the lugs 50 will move into engagement with the tongues 52 and carry them upwardly, thereby lifting the cover 28 off the seat 22 and breaking the seal therebetween.

A toggle securing means 54 comprises a link 56 and a cam member 66 which cooperate to maintain the bar 36 in its depressed operative position. The link 56 has terminal bearing sockets 60 on opposite sides of a longitudinal web portion which is adapted for movement through the space between the adjacent trunnions 26 when the latter are engaged by said bearing sockets 60 for oscillating movement of said link 56. When in operative position on the trunnions, both said link and the bar 36 are retained against casual displacement by the body member 18; moreover, the latter is formed with enlargements at approximately the height of the trunnions 26 and adapted for engagement by terminal nose portions formed on said link and bar respectively, thereby also limiting the movement of the link and bar into inoperative or open position (see link 56 in Figure 4).

The cross bar 62 at the other end of the link 56 is adapted to be positioned in the bearing recess 64 of the cam member 66 which in turn engages the depression 44 at the free end of the bar or lever 36. The said cam member 66 is provided with a lever arm 68 adapted to be moved to a position substantially parallel with the bar 36 in effecting the cam or toggle action in which the cross bar 62 is moved past center, thereby compressing the gaskets 34, after which the tendency will be to move the lever 68 toward the bar 36, thereby insuring the proper securing of the parts. The cross bar 62 of link 56 is grooved at 70 to receive the boss 72 extending into recess 64 from the cam member 66, when those parts are in a certain relative position; thereafter as the cam member is rotated on the cross bar the cam member will be secured in its proper operative or closed position.

Figure 4:
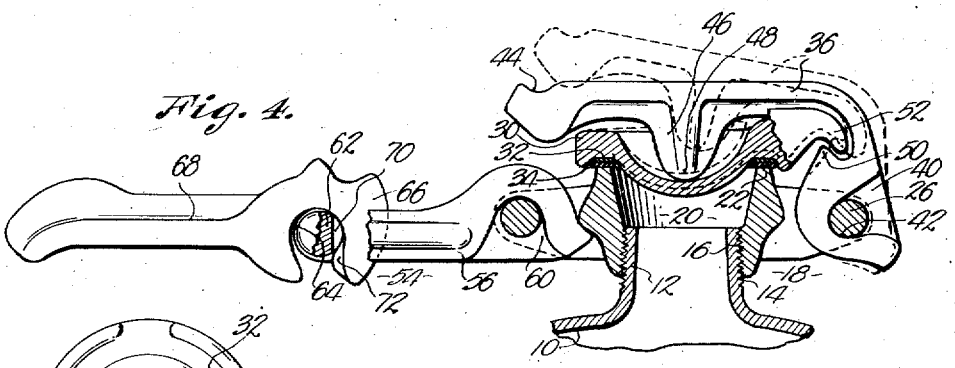
Figure 4 is a side elevation, partly in section, showing the closure structure in partly opened position, with dotted lines indicating the position in which the cover member is partly raised off its seat.
Figure 5:
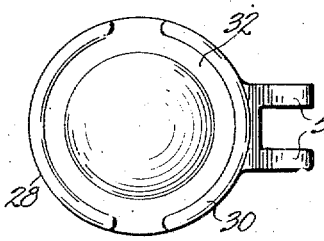
Figure 5 is an inverted plan view of the cover member.

Referring to Figures 1 and 4 it will be noted that the tongues 52 do not contact the bar 36 when the cover member is in the closed position, so that the only contact the securing bar has with said cover member is that which takes place between the rounded end 48 of the lug 46 and the central portion of the cover member and this being at a point below the joint between said cover member and the seat 22.

This special form of the cover member securing means and mode of operation of same insures a very definite and accurate positioning of the closure parts.

It will be observed that each and every part of the closure structure is easily removable from its mounting without the removal of pins or the like; and furthermore, each part can be cast and immediately used without the necessity of any machining, thereby eliminating much expense. The principal reason why no close fits are required in the present improved construction is because of the structural character of the sealing parts and the fact that the jar rubber gaskets can be easily varied to vary the thickness of the sealing layer by adding to or removing from the gasket assembly one or more of the jar rubbers as required.

It will be noted that when the closure structure is open, the operator has free access to the interior of the tank through the opening 20.

While I have illustrated and herein described a very practical and efficient embodiment of the improvements comprising my invention, it is obvious that various formal changes and modifications may readily be made while still embracing the essential characteristics of the invention, and I desire to reverse the right to such variations as may fall within the spirit and scope of my invention as defined in the appended claims.

What I claim as new and desire to secure by Letters Patent is:

1. A closure comprising a tubular body member adapted to be secured for communication with a container and having an annular seat at its outer extremity; a cup-shaped cover member having an annular groove adapted to receive said annular seat with a gasket therebetween when the cupped portion is extended into the opening of said body member below said seat, a bar releasably pivoted at one side of said body member for movement to and from a position to extend entirely across said cover member thereabove and having a depending control lug with a rounded end extending into said cup-shaped cover and contacting the bottom thereof below said annular seat; and toggle means releasably pivoted to the other side of said body member, operable to force and secure said bar against said cover member whereby the gasket between the cover member and seat is compressed.

2. A closure comprising a tubular body member adapted to be secured for communication with a container and having an annular seat at its outer extremity; a cup-shaped cover member having an annular groove adapted to receive said annular seat with a gasket therebetween when the cupped portion is extended into the opening of said body member below said seat, a bar releasably pivoted at one side of said body member for movement to and from a position to extend entirely across said cover member thereabove and having a depending control lug with a rounded end extending into said cup-shaped cover and contacting the bottom thereof below said annular seat; toggle means releasably pivoted to the other side of said body member, operable to force and secure said bar against said cover member whereby the gasket between the cover member and seat is compressed, and a lug carried by said bar adapted to engage and tilt said cover member on said seat as said bar is moved from the cover securing position.

3. A closure structure comprising a body member having a closure seat, a movable cover member adapted for closure engagement with said seat, said body member having pairs of trunnions, with the trunnions of each pair spaced apart in axial alignment, and cover securing means comprising cooperative pivotal members each formed with open bearing recesses separated by a web portion accommodated by the space between the trunnions, said trunnions being engaged with said bearing recesses and thereby journalling said pivotal members for movement into interlocking engagement above said cover member with one of said pivotal members in clamping relation with said cover member.

4. A closure structure comprising a body member having a closure seat, a movable cover member mounted in floating engagement with said seat and formed with a pair of spaced hook elements, and securing means including a cover actuating bar movable into and out of clamping engagement therewith, said bar being formed with a projection entering the space between said hook elements to prevent rotation of said cover member and also having a pair of lugs engageable with said hook elements for lifting said cover member on movement of said bar for releasing its clamping engagement with the cover member.

5. A closure structure comprising, a body member having a closure seat and also formed with exterior horizontal trunnion elements on opposite sides of the body member, a movable cover member for engagement with said seat, and cover-securing means comprising a cover actuating bar pivotally mounted on one of said trunnions and movable into position across the top of said cover member for clamping engagement therewith and toggle actuating means comprising a toggle link and a cam member for operative engagement with said bar for clamping the same against said cover member, said cover actuating bar and one end of said toggle link being formed with outwardly opening bearing recesses for removable engagement with said trunnions respectively and permitting detachment of said bar and link therefrom only after movement of the bar and link out of cover clamping position.

HERBERT WOLCOTT.